US007512988B2

(12) United States Patent
Miyamoto et al.

(10) Patent No.: US 7,512,988 B2
(45) Date of Patent: Mar. 31, 2009

(54) DATA TRANSMISSION APPARATUS AND METHOD FOR MANAGEMENT OF USER IDENTIFICATION DATA ALLOCATED TO IMAGE DATA

(75) Inventors: Masayoshi Miyamoto, Kanagawa (JP); Yuichi Araumi, Kanagawa (JP); Tatsuya Inagaki, Shizuoka (JP); Hiroyuki Kinbara, Kanagawa (JP); Teruyuki Maruyama, Kanagawa (JP); Toru Matsuda, Tokyo (JP); Tatsuo Miyachi, Tokyo (JP); Kiyoshi Suzuki, Tokyo (JP); Hideyuki Watanabe, Kanagawa (JP); Takashi Yoshikawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 879 days.

(21) Appl. No.: 10/727,592

(22) Filed: Dec. 5, 2003

(65) Prior Publication Data
US 2004/0109019 A1 Jun. 10, 2004

Related U.S. Application Data

(63) Continuation of application No. 09/559,076, filed on Apr. 27, 2000, now Pat. No. 6,687,829.

(30) Foreign Application Priority Data

Apr. 28, 1999 (JP) ................................ 11-122406
Mar. 28, 2000 (JP) ............................ 2000-088200

(51) Int. Cl.
*H04K 1/00* (2006.01)
(52) U.S. Cl. .............................. 726/28; 726/26; 726/27

(58) Field of Classification Search .................. 726/26, 726/27, 28; 358/403, 1.15
See application file for complete search history.

(56) References Cited

U.S. PATENT DOCUMENTS 6,141,111 A * 10/2000 Kato ......................... 358/1.15

(Continued)

FOREIGN PATENT DOCUMENTS

JP 05-298377 11/1993

(Continued)

OTHER PUBLICATIONS

Smart cameras as embedded systems Wolf, W.; Ozer, B.; Lv, T.; Computer vol. 35, Issue 9, Sep. 2002 pp. 48-53.*

(Continued)

*Primary Examiner*—David Y Jung
(74) *Attorney, Agent, or Firm*—Oblon, Spivak, McClelland, Maier & Neustadt, P.C.

(57) ABSTRACT

In a data transmission apparatus and method of the present invention, a specific operator ID for an operator who uses a data processing device to process image data to be copied or transmitted, is selected. Specific owner IDs for owners who are authorized to access the image data, are selected. User identification data, inclusive of all operator IDs and owner IDs correlated to the data processing device, are stored in a storage device each time image data is captured by the data processing device. Allocation of the stored user identification data to each of the image data is managed by reading items of the user identification data from the storage device in response to the selections of the specific operator ID and the specific owner IDs and displaying the user identification data items.

12 Claims, 9 Drawing Sheets

U.S. PATENT DOCUMENTS

| | | | |
|---|---|---|---|
| 6,216,229 B1 | | 4/2001 | Fischer |
| 6,317,830 B1 | | 11/2001 | Stolz |
| 6,438,574 B1 | * | 8/2002 | Nagashima ................ 709/232 |
| 6,513,119 B1 | | 1/2003 | Wenzel |
| 6,762,860 B1 | * | 7/2004 | Watanabe et al. ........... 358/403 |
| 2004/0109019 A1 | | 6/2004 | Miyamoto et al. |

FOREIGN PATENT DOCUMENTS

| | | |
|---|---|---|
| JP | 07-321956 | 12/1995 |
| JP | 08-030531 | 2/1996 |
| JP | 09-127121 | 5/1997 |
| JP | 11-224222 | 8/1999 |

OTHER PUBLICATIONS

Electronic imaging of fingermarks Jackson, G.R.; Bramble, S.K.; Security and Detection, 1995., European Convention on May 16-18, 1995 pp. 261-266.*

Analysis and Compensation of Rolling Shutter Effect Liang, C.-K.; Chang, L.-W.; Chen, H. H.; Image Processing, IEEE Transactions on vol. 17, Issue 8, Aug. 2008 pp. 1323-1330.*

Gallagher et al., Evidence quality imaging for bank security, Security Technology, 1995, Proceedings, Institute of Electrical and Electronics Engineers 29th Annual 1995 International Carnahan Conference on, Oct. 18-20, 1995, pp. 441-445.

Sen et al., A novel algorithm for scrambling the details of digital image, Intelligent Control and Automation, 2002, Proceedings of the 4th World Congress on, vol. 2, Jun. 10-14, 2002, pp. 1333-1336, vol. 2.

Barrientos, Screener threat detection performance with three dimensional X-ray imaging, Security Technology, 2000, Proceedings, IEEE 34th Annual 2000 International Carnahan Conference on, Oct. 23-25, 2000, pp. 178-189.

U.S. Appl. No. 10/915,437, filed Aug. 11, 2004, Maruyama.
U.S. Appl. No. 10/727,592, filed Dec. 5, 2003, Miyamoto et al.
U.S. Appl. No. 10/885,624, filed Jul. 8, 2004, Watanabe.
U.S. Appl. No. 09/407,768, filed Sep. 29, 1999, Maruyama et al.
U.S. Appl. No. 10/936,585, filed Sep. 9, 2004, Araumi et al.
U.S. Appl. No. 11/009,415, filed Dec. 13, 2004, Harada et al.
U.S. Appl. No. 10/696,064, filed Oct. 21, 2004, Mihira et al.
U.S. Appl. No. 11/239,013, filed Sep. 30, 2005, Takeuchi et al.
U.S. Appl. No. 11/854,103, filed Sep. 12, 2007, Araumi.

* cited by examiner

DATA TRANSMISSION APPARATUS AND METHOD FOR MANAGEMENT OF USER IDENTIFICATION DATA ALLOCATED TO IMAGE DATA

BACKGROUND OF THE INVENTION

1. Field of The Invention

The present invention relates to a data transmission apparatus provided in a data processing device which captures a document image, processes the document image and stores the image data in a storage device. The data transmission apparatus transmits the image data to a storage management device of a filing system together with user identification data allocated to the image data, so as to store the document image in the storage management device together with the user identification data. The present invention also relates to a data transmission method which is appropriate for use in the data processing device.

2. Description of The Related Art

Traditionally, document images that contain important information (including characters, images, photographs, etc.) are printed on paper, such as copy sheets, and the copy sheets are stored in the form of files in departmental user rooms or private offices, for the purpose of subsequent uses.

A conventional filing system in which data processing devices (such as personal computers or workstations) are connected to a file server on a local area network via transmission lines is known. Typically, each of the data processing devices has a copying or facsimile function. When the copying or facsimile function is performed on one of the data processing devices, a scanner captures a document image by optically scanning the document. The document image is photoelectrically converted into an electrical signal, and the electrical signal is processed so that image data is produced. After the document is copied or transmitted, the image data is stored in a mass storage device, such as a hard disk drive. The image data stored in the storage device may be transmitted from the data processing device to the file server on the network via the transmission line. The image data is stored in the file server and placed thereon as shared data for subsequent use. The conventional filing system allows the individual data processing devices on the network to access the image data on the remote file server.

However, in the conventional filing system, complicated tasks are required for the users at the time of capturing of each document image using the scanner as well as at the time of transmission and storage of the image data in the file server. When the number of documents that must be exchanged between authorized users is large, the image capturing will become a considerably time-consuming operation. In addition, the access to the stored image data on the remote file server needs complicated operations by the users on the data processing devices. These problems cause the delay of implementation and proliferation of the conventional filing systems.

In order to eliminate the above problems of the conventional filing system, the inventors of the present invention have designed a novel, useful data processing device, for use in a filing system, which creates identifications of the authorized users who are allowed to access the image data, at the time of capturing of the document images. Further, the data processing device stores the image data and the user identifications together in a storage device such that the stored image data can be subsequently accessed by the authorized users indicated by the user identifications.

By taking account of the above matters, it is desired to provide increased operability and availability of image data for the users during the time the user identification data for the image data is entered into the data processing device, and to maintain security of the image data stored in the data processing device.

SUMMARY OF THE INVENTION

In order to overcome the problems described above, preferred embodiments of the present invention provide a data transmission apparatus and method that provide increased operability and availability of image data for the users during the time the user identification data for the image data is entered into the data processing device, and maintain security of the image data stored in the data processing device.

According to one preferred embodiment of the present invention, a data transmission apparatus is provided in a data processing device connected to a storage management device via a transmission line, for transmitting image data, captured by the data processing device, to the storage management device via the transmission line together with user identification data correlated to the image data, and the data processing apparatus includes: a user identification selection unit which selects a specific operator ID for an operator who uses the data processing device to process the image data to be copied or transmitted, and selects specific owner IDs for owners who are authorized to access the image data; and an authorized user management unit which stores user identification data, inclusive of all operator IDs and owner IDs correlated to the data processing device, in a storage device each time image data is captured, and manages allocation of the stored user identification data by reading items of the user identification data from the storage device in response to the selections by the user identification selection unit and displaying the user identification data items.

According to another preferred embodiment of the present invention a data transmission method for a data processing device connected to a storage management device via a transmission line, in which image data captured by the data processing device is transmitted to the storage management device via the transmission line together with user identification data correlated to the image data, includes the steps of: selecting a specific operator ID for an operator who uses the data processing device to process the image data to be copied or transmitted; selecting specific owner IDs for owners who are authorized to access the image data; storing user identification data, inclusive of all operator IDs and owner IDs correlated to the data processing device, in a storage device each time image data is captured; and managing allocation of the stored user identification data by reading items of the user identification data from the storage device in response to the selections and displaying the user identification data items.

In the data transmission apparatus and method of the present invention, the user identification data for the image data that need to be exchanged between the authorized users can be easily and conveniently handled by the users when the image data is captured and stored. The image data and the user identification data are stored together in the data processing device and in the storage management device in such a manner that the stored image data are subsequently accessed by only the authorized users indicated by the user identification data. The data transmission apparatus and method of the present invention are effective in providing increased operability and availability of the stored image data for the users during the time the user identification data for the stored image data is entered into the data processing device, and in maintaining security of the image data stored in the data processing device.

BRIEF DESCRIPTION OF THE DRAWINGS

Other objects, features and advantages of the present invention will be apparent from the following detailed description when read in conjunction with the accompanying drawings in which.

DETAILED DESCRIPTION OF PREFERRED EMBODIMENTS

A description will now be provided of preferred embodiments of the present invention with reference to the accompanying drawings.

The data transmission apparatus and method of the present invention provide improvements on the filing system and method disclosed in U.S. patent application Ser. No. 09/407,768, filed on Sep. 29, 1999, the contents of which are hereby incorporated by reference.

In the following descriptions, the data processing device refers to any of image forming devices including digital copiers, complex copiers, etc. that are equipped with scanning, copying and facsimile functions and connected to a filing system via a transmission line. The data transmission apparatus of the invention is provided in the data processing device to carry out user identification allocation and storage processes.

Figure 1:
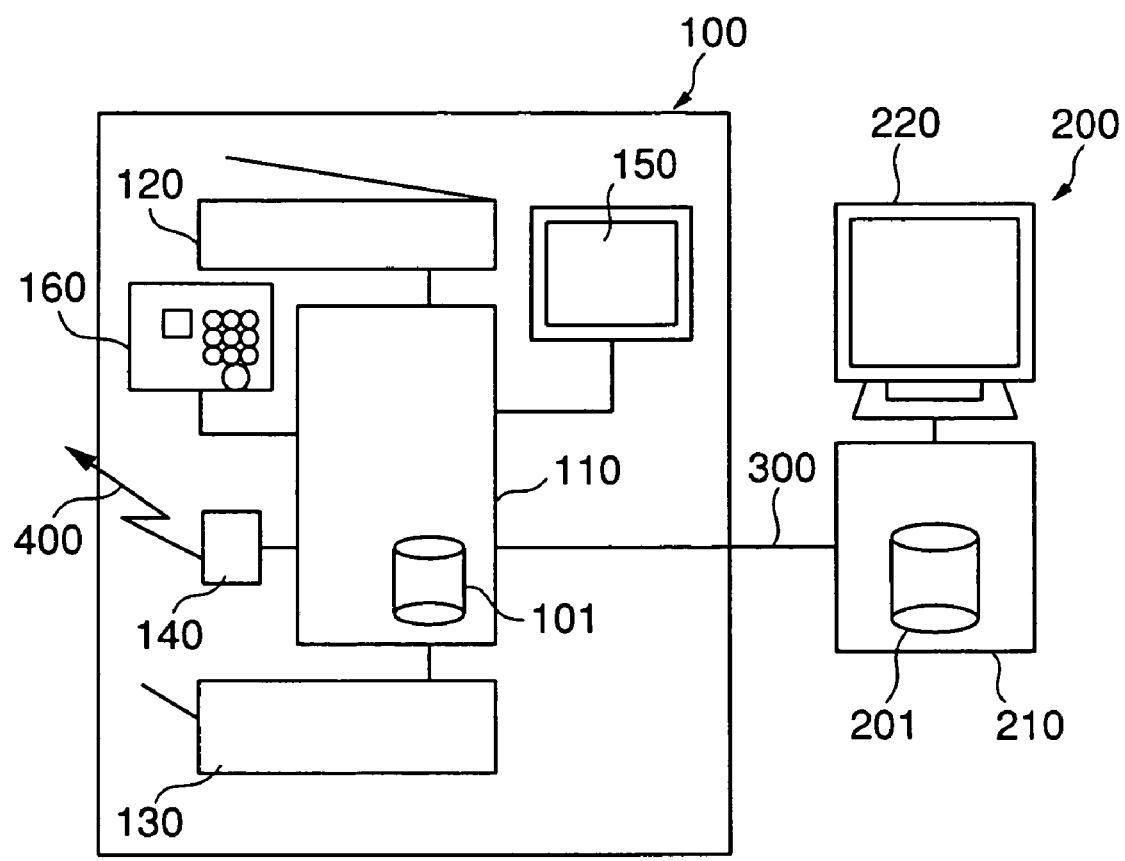
FIG. 1 is a block diagram of a data processing device to which one preferred embodiment of the data transmission apparatus of the invention is applied.

FIG. 1 shows a data processing device to which one preferred embodiment of the data transmission apparatus of the invention is applied.

In FIG. 1, a data processing device 100 in the present embodiment is connected to a filing system 200 via a transmission line 300. For the sake of simplicity of description, only one data processing device is connected to the filing system 200 in the embodiment of FIG. 1. In practical applications, however, a plurality of data processing devices may be connected to the filing system 200 via transmission lines.

The transmission line 300 which connects the data processing device 100 to the filing system 200 is, for example, an Ethernet cable. The filing system 200 includes a file server 210 and a display monitor 220, and the file server 210 is provided with a hard disk drive 201 that serves as a mass storage device.

When a plurality of data processing devices are connected to the filing system 200 via the Ethernet cable, the data processing devices (often called the clients) and the file server 210 constitute a local area network or an Intranet. With shared data being placed on the file server 210, the filing system 200 provides the individual data processing devices access to data files located on the file server 210 rather than a client local disk.

The data processing device 100 acts as a backup system which automatically stores image data when it is copied or faxed by the users, and, when needed, it serves as a security system which allows only authorized users to access the stored image data. Further, the data processing device 100 transmits the stored image data to the filing system 200 via the transmission line 300. The filing system 200 stores and manages the received image data in the hard disk drive 201 of the file server 210. When needed, the data processing device 100 accesses the image data on the hard disk drive 201 and downloads the image data from the filing system 200 into the data processing device 100.

As shown in FIG. 1, the data processing device 100 generally comprises a controller 110, a scanner 120, a printer 130, a communication control unit (CCU) 140, a touch panel 150, and a control keyboard 160. The elements 120 through 160 of the data processing device 100 are connected to the controller 110, and the controller 110 controls the elements 120 through 160.

The scanner 120 captures a document image by optically scanning the document to be copied or transmitted. The printer 130 prints the captured or received image on a copy sheet and outputs the copy sheet on which the image is printed. The communication control unit (CCU) 140 is connected to a public switched telephone network (PSTN) or the like via a communication line 400.

When transmitting or receiving image data, the CCU 140 executes circuit-switching procedures in order to connect the controller 110 to or disconnect the controller 110 from an external communication device on the PSTN via the communication line 400. The CCU 140 includes an internal modem unit and carries out facsimile transmission procedures through modulation and demodulation of the image data and protocol signals by the modem unit.

The controller 110 includes a storage device 101 (for example, a hard disk drive), and this storage device 101 stores image data or files, which are captured or received, on a magnetic storage medium. The touch panel 150 displays operational messages and inputs control instructions given by the operator (which will be described later). The control keyboard 160 inputs device control conditions, device operational states, and user settings and commands (which will be described later).

Further, in the data processing device 100, the controller 110 is constituted by a central processing unit (CPU), a read-only memory (ROM) and a random access memory (RAM) that are interconnected by a bus. The CPU reads a control program from the ROM, loads it into the RAM, and then performs the overall system control processes of the elements 120 through 160 in accordance with the control program. The device control conditions and management data are installed in the ROM.

The data transmission apparatus and method of the present embodiment are applied to the data processing device 100 by installing control programs related to the flowcharts of FIG. 5 and FIG. 6 (which will be described later) in a memory (for example, the ROM) of the controller 110. Each of the control programs comprises program code instructions stored in the memory of the controller 110.

Figure 2:
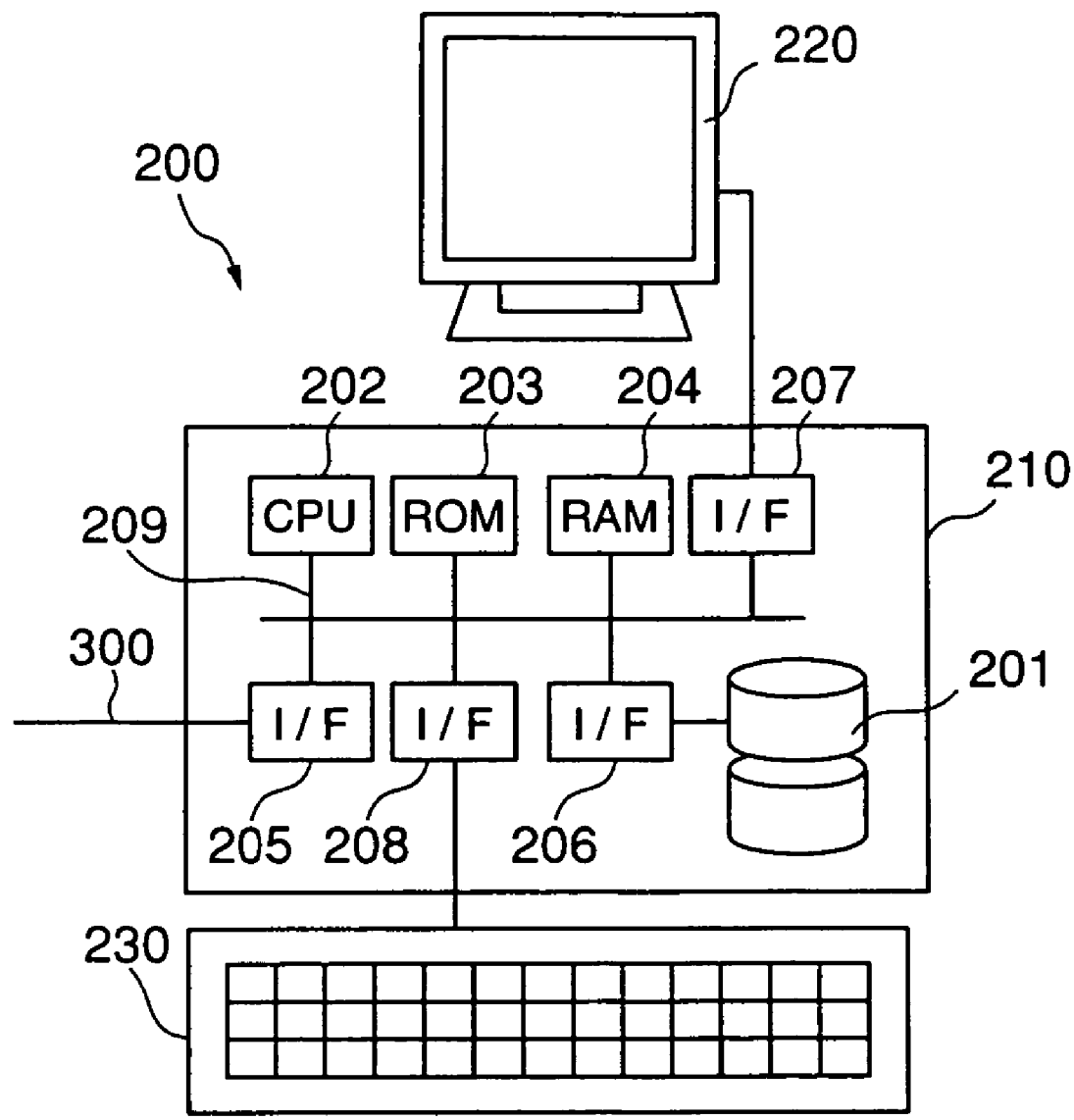
FIG. 2 is a block diagram of a storage management device to which the data processing device of FIG. 1 is connected.

FIG. 2 shows a storage management device to which the data processing device 100 of FIG. 1 is connected via the transmission line 300.

The storage management device in the present embodiment is the file server 210 that is constituted by a personal computer or workstation. As shown in FIG. 2, the file server 210 generally comprises a hard disk drive 201, a CPU 202, a ROM 203, a RAM 204, a network interface (I/F) 205, a disk interface (I/F) 206, a display interface (I/F) 207 and a keyboard interface (I/F) 208 which are interconnected by a bus 209.

In the file server 210 of FIG. 2, the CPU 202 reads out an application program from the hard disk drive 201, loads it into the RAM 204, and then performs the overall system control processes of the elements 203 through 208 in accordance with the application program. The hard disk drive 201 is internally attached to the file server 210 via the disk interface 206. The display monitor 220 is externally attached to the file server 210 via the display interface 207. The keyboard 230 is externally attached to the file server 210 via the keyboard interface 208.

Further, in the file server 210 of FIG. 2, the transmission line 300 from the data processing device 100 is connected to the file server 210 via the network interface 205. As previously described, the transmission line 300 in the present embodiment is an Ethernet cable, and when a plurality of data processing devices are connected to the filing system 200 via the Ethernet cable, the data processing devices (the clients) and the file server 210 constitute a local area network or an Intranet. With shared data being placed on the file server 210, the filing system 200 provides the individual data processing device access to data files located on the file server 210.

When the data processing device 100 transmits the image data to the file server 210 together with the user identification data (which will be described later) that is allocated to the image data, the file server 210 receives them from the data processing device 100 via the transmission line 300, stores the image data and the user identification data in the hard disk drive 201, and manages the stored image data by correlating the image data with the user identification data.

The file server 210 in the present embodiment is configured such that, when a user ID that corresponds to one of user IDs of the user identification data is input from the keyboard 230, the CPU 202 reads out the image data correlated to the input user ID, from the hard disk drive 201, and allows the display monitor 220 to display the retrieved image data thereon in a readable form. When a given operational command is input from the keyboard 230 at that time, the CPU 202 allows the display monitor 220 to display one or a plurality of thumbnail images of the retrieved image data thereon, or the CPU 202 transmits the retrieved image data to the data processing device 100 via the transmission line 300.

The data processing device 100 in the present embodiment is configured such that the image data stored in the storage device 101, after the document image was captured and then it was copied or transmitted, is exchanged between the authorized users. The access to the stored image data is allowed only for the authorized users. Further, as described above, the filing system 200 and the data processing device 100 in the present embodiment are configured such that the stored image data and the user identification data are transmitted from the data processing device 100 to the file server 210 via the transmission line 300. The stored image data that is located on the file server 210 may be downloaded to the data processing device 100 and exchanged between the authorized users when needed at any times following the time of the copying or transmission. For this purpose, in the present embodiment, a plurality of authorized user identifications (which will be called the user IDs) correlated to the stored image data are predetermined in a discrete manner.

In the following descriptions, the authorized users are classified into two categories: operators who actually use the data processing device 100 to process the image data to be copied or transmitted; and owners who are authorized to access the image data because of their job responsibilities. In the present embodiment, a plurality of operator identifications and a plurality of owner identifications are also predetermined in a discrete manner.

Figure 3:
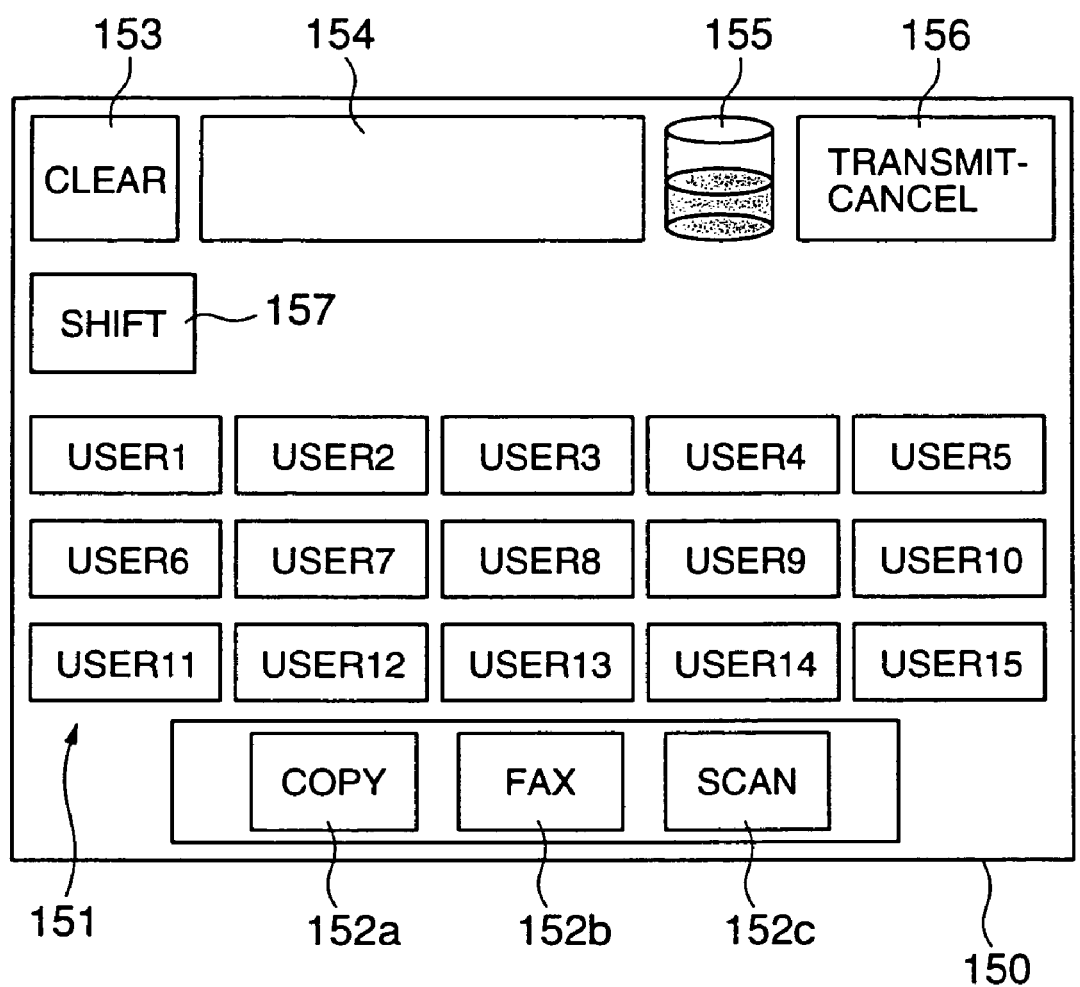
FIG. 3 is a diagram showing an operational display page of a touch panel in the data processing device of FIG. 1.

FIG. 3 shows an operational display page of a touch panel in the data processing device 100 of FIG. 1.

As shown in FIG. 3, the operational display page of the touch panel 150 includes a plurality of user select buttons 151 (e.g., a user1 button, user2 button, etc.), a copy function select button 152a, a facsimile function select button 152b, a scanner function select button 152c, a clear button 153, an operational message indication region 154, an available-disk-space indication region 155, a transmission cancel button 156, and a shift button 157.

Figure 4:
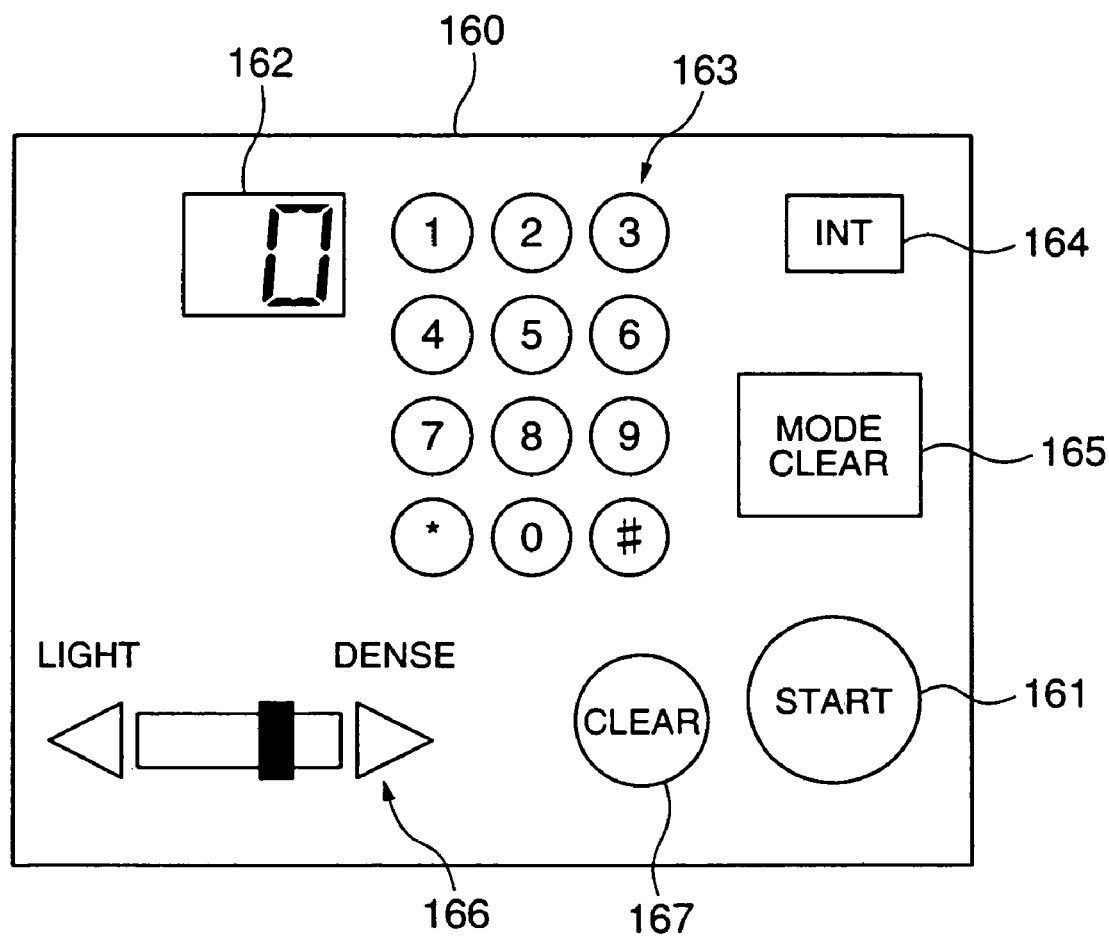
FIG. 4 is a diagram showing operational keys and displays of a control keyboard in the data processing device of FIG. 1.

FIG. 4 shows operational keys and displays of a control keyboard in the data processing device of FIG. 1.

As shown in FIG. 4, the control keyboard 160 includes a start key 161, a counter display 162, a set of numeral keys 163 (including ten keys "0" to "9", an asterisk key "*" and a sharp key "#"), an interrupt ("INT") key 164, a mode clear key 165, an optical-density adjusting slide key 166, and a clear key 167.

Before allowing the desired operation of the data processing device 100 to start, the operator depresses first one of the user select buttons 151 corresponding to the operator, and subsequently depresses one of the function select buttons 152a-152c corresponding to the desired operation. When the start key 161 of the control keyboard 160 is turned on or depressed by the operator, the data processing device 100 starts running of the selected operation (one of the copying, facsimile and scanning functions) in accordance with the operating conditions (such as the number of copies, the image capturing optical-density and others) indicated by the control keyboard 160. If a document to be copied or transmitted is placed on the scanner 120 at that time, the scanner 120 captures a document image by optically scanning the document, and the controller 110 stores the image data or file in the storage device 101. At the same time as the above operations, the controller 110 produces user identification data (including the operator's user ID and others) in accordance with the depressed user select button 151, correlates the user identification data to the stored image data, and then temporarily stores the user identification data in the storage device 101 together with the image data. Within a given time period after the end of the temporary storing of the user identification data, the controller 110 transmits the image data and the user identification data to the file server 210 via the transmission line 300.

In the touch panel 150 of FIG. 3, the clear button 153 is provided to cancel an input instruction that has been entered by the operator on the touch panel 150. The operational message indication region 154 is provided to indicate an operational message such as an input guidance message for the operator. The available-disk-space indication region 155 is provided to indicate in a diagram form the amount of available storage of the storage device 101. The transmit-cancel button 156 is provided to accept the cancellation of the transmission of the image data and user identification data to the file server 210 during the image capturing or immediately after the end of the image capturing. Further, in the touch panel 150 of FIG. 3, the shift button 157 is provided to shift the order of displaying of sets of user identification selections on the touch panel 150 to one of chronological order or reverse chronological order, or the others.

In the touch panel 150 of FIG. 3, the plurality of user select buttons 151 are labeled with the "user1" and so on. However, the present invention is not limited to this embodiment. Alternatively, the plurality of user select buttons 151 may be labeled with individual user names or the like.

In the control keyboard 160 of FIG. 4, the start key 161 is provided to start the running of the data processing device 100 when it is depressed. The counter display 162 is provided to indicate the number of copy sheets or the number of copy sheets being processed during the copying or facsimile operation. The numeric keys 163 are provided to enter an input number to the data processing device 100. The interrupt key 164 is provided to perform an interruption process when it is depressed during the running of the data processing device 100. The slide key 166 is provided to adjust the capturing image density of the data processing device 100 when the bar indicator is moved in one of the two opposite directions ("LIGHT" and "DENSE") by the operator. The clear key 167 is provided to cancel the input instruction of the operator or stop the running of the data processing device 100 when it is depressed.

Further, the data processing device 100 in the present embodiment is configured such that, after one of the user select buttons 151 of the touch panel 150 corresponding to the operator (which button is called the input user select button 151) is first depressed and before one of the function select buttons 152a-152c corresponding to the desired function is subsequently depressed by the operator, the controller 110 sets the touch panel 150 in a waiting condition for receiving one or more additional touch panel inputs, for example, one or more additional selections of the user select buttons 151 by the operator.

In the RAM (not shown) of the controller 110 in the present embodiment, five sets or less of the authorized user identifications (or the user IDs) of five or less latest selections that have been performed by the operator with respect to the input user select button 151 are stored (which are called the input history data) with their allocations to the individual user select keys 151 of the touch panel 150. After the one of the user select buttons 151 is first depressed (the first attempt), the input user select button 151 of the touch panel 150 is set in ON state. Suppose that, before the depression, the input user select button 151 was set in OFF state. If the input user select button 151 is depressed again by the operator (the second attempt), the individual user select buttons 151 of the touch panel 150, allocated for the set of the authorized user identifications of the latest user selection, are set in ON state. Suppose that, before the second depression, the individual user select buttons 151 for the latest user selection was set in OFF state. If the input user select button 151 is further depressed by the operator (the third or subsequent attempt), the individual user select buttons 151 of the touch panel 150, allocated for the set of the authorized user identifications of the second latest or subsequent user selection, are set in ON state.

With the individual user select buttons 151 of the touch panel 150 (allocated for one of the sets of the stored authorized user identifications) being set in ON state, one of the function select buttons 152a-152c corresponding to the desired function of the data processing device 100 is subsequently depressed, and finally the start key 161 of the control keyboard 160 is depressed by the operator. Then, the data processing device 100 starts the creation of the user identification data allocated to the image data in accordance with the stored authorized user identifications for the ON-state user select buttons 151 of the touch panel 150. Specifically, the controller 110 of the data processing device 100 produces the user identification data, allocated to the stored image data, by reading out the stored authorized user identifications from the RAM. The user identification data (the user IDs) produced at that time is inclusive of the operator identification (the operator ID) of the input operator and the selected owner identifications (the selected owner IDs).

Hence, the start key 161 of the control keyboard 160 serves as a determining unit which determines the operator's final selection of the authorized user identifications on the user select buttons 151 of the touch panel 150 for the image data captured. By incorporating the start key 161 that carries out this function as well as the starting function of the running of the data processing device 100, the data transmission apparatus of the present embodiment is characterized by the determining unit, which determines a final selection of the authorized user identifications by the operator.

Further, the data processing device 100 in the present embodiment is configured such that, after one of the user select buttons 151 of the touch panel 150 corresponding to the operator (the input user select button 151) is first depressed and before one of the function select buttons 152a-152c corresponding to the desired function is subsequently depressed by the operator, the controller 110 sets the touch panel 150 in a waiting condition for receiving another touch panel input, for example, a depression of the clear button 153 by the operator.

After the clear button 153 of the touch panel 150, rather than the input user select button 151, is depressed at that time, the controller 110 enables the touch panel 150 to accept a new set of the authorized user identifications that are separate from the sets of the authorized user identifications of the latest selections that have already been stored in the RAM of the controller 110 with respect to the input user select button 151. If a new set of the user select buttons 151 of the touch panel 150 are subsequently depressed by the operator, the individual user select buttons 151, allocated for the new set of the authorized user identifications, are set in ON state. The controller 110 then stores the authorized user identifications of the new selection in the RAM as the latest selection with respect to the input user select button 151.

In the above case in which the clear button 153 of the touch panel 150 is depressed, if the clear button 153, rather than the new set of the user select buttons 151, is depressed again and the start key 161 is depressed by the operator, the controller 110 stores only the authorized user identification (the operator ID) of the present operator in the RAM as the latest selection with respect to the input user select button 151.

In the above case in which the clear button 153 of the touch panel 150 is depressed and a new set of the user select buttons 151 of the touch panel 150 are subsequently depressed by the operator, if the authorized user identifications of the new selection entirely accord with one of the five sets or less of the authorized user identifications of the latest selections already stored in the RAM of the controller 110 with respect to the input user select button 151, the controller 110 inhibits the storage of the authorized user identifications of the new selection into the RAM so as to avoid duplicate storage.

Further, the data processing device 100 in the present embodiment is configured such that, after one of the user select buttons 151 of the touch panel 150 corresponding to the operator (the input user select button 151) is first depressed and before one of the function select buttons 152a-152c corresponding to the desired function is subsequently depressed by the operator, the controller 110 sets the touch panel 150 in a waiting condition for receiving another touch panel input, for example, a depression of the shift button 157 by the operator.

After the shift button 157 of the touch panel 150, rather than the input user select button 151, is depressed at that time, the controller 110 enables the touch panel 150 to set the individual user select buttons 151 of the touch panel 150, allocated for the set of the authorized user identifications of the oldest user selection, are set in ON state. In other words, the sequence of displaying the ON-state user select buttons 151 for the latest user selection first and the oldest user selection last is reversed to the inverted sequence by the depression of the shift button 157. Suppose that, before the depression of the shift button 157, the individual user select buttons 151 for the oldest user selection was set in OFF state.

In the data transmission apparatus of the present embodiment, the user select buttons 151 of the touch panel 150 serve as a user identification selection unit which inputs a selection of a specific operator ID for an operator who uses the data processing device 100 to process the image data to be copied or transmitted, and inputs selections of specific owner IDs for owners who are authorized to access the image data. The controller 110 of the data processing device 100 serves as an authorized user management unit which stores the user identification data inclusive of all operator IDs and owner IDs correlated to the data processing device 100, and manages the allocation and transmission of the stored user identification data in response to the selections of the specific operator ID and the specific owner IDs input by the user identification selection unit. By incorporating the controller 110 and the touch panel 150 in the data processing device 100 such that the data processing device 100 carries out the above-mentioned functions, the data transmission apparatus of the present embodiment is characterized by the user identification selection unit and the authorized user management unit.

Figure 5:
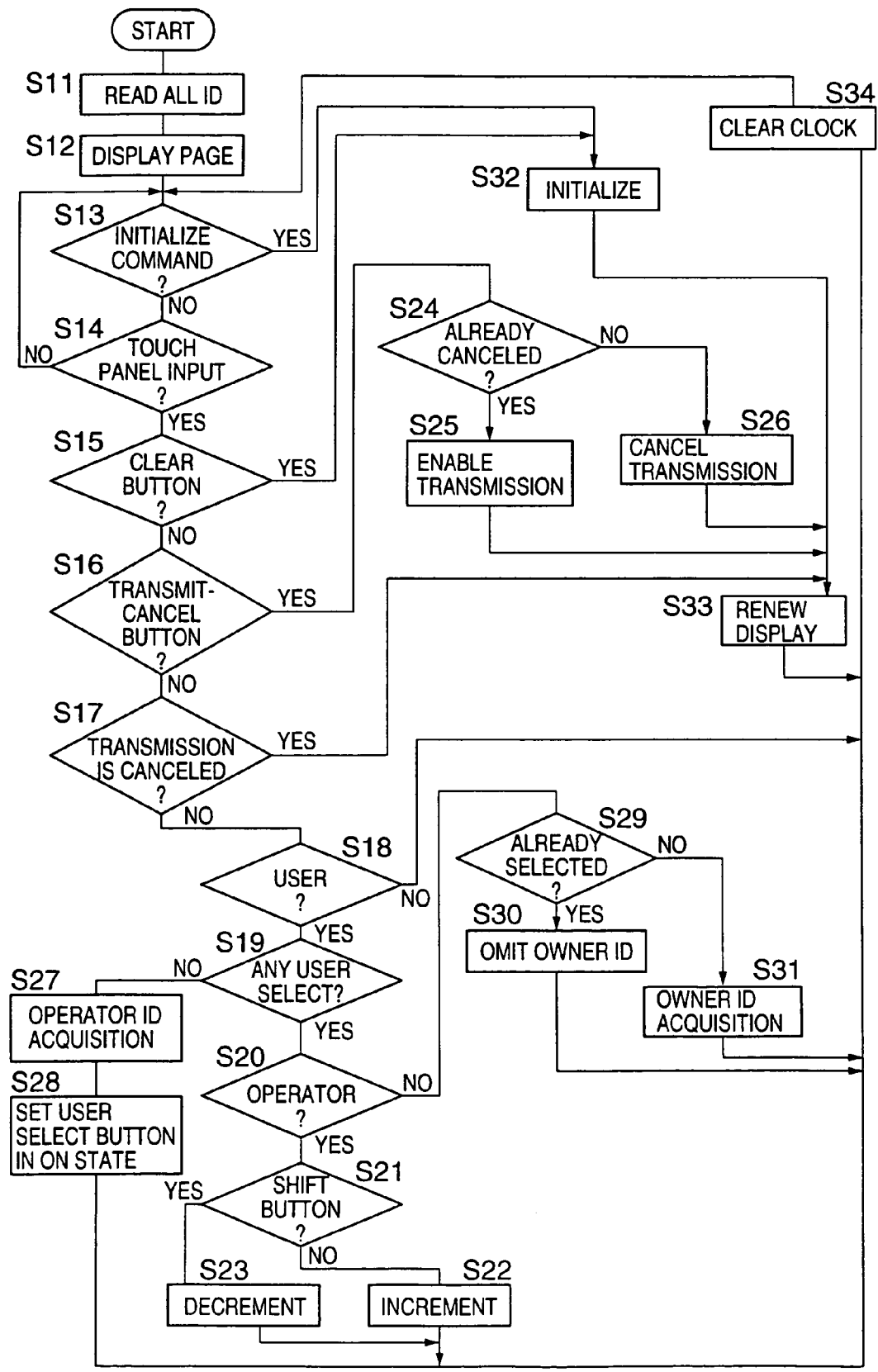
FIG. 5 is a flowchart for explaining a user identification data allocation process executed by the data processing device of FIG. 1.

FIG. 5 shows a user identification data allocation process executed by the controller 110 of the data processing device of FIG. 1. As described above, the data transmission apparatus and method of the present embodiment is applied to the data processing device 100 by installing a control program related to the flowchart of FIG. 5 in the ROM of the controller 110.

In the following descriptions, the CPU of the controller 110 of the data processing device 100 of FIG. 1 is referred to as the controller, for the sake of simplicity of description.

At a start of the user identification data allocation process of FIG. 5, step S11 causes the controller to read out all the user IDs of a user identification data file from the storage device 101 so that they are loaded into the RAM of the controller. In the present embodiment, this user identification data file is stored, in advance, in the storage device 101, and all the user IDs, inclusive of the operator IDs and the owner IDs, and other operational matters which are predetermined with respect to the data processing device 100 are contained in the user identification data file.

After the step S11 is performed, step S12 causes the controller to display the operational display page of the touch panel 150 based on the read-out data of the user identification data file obtained in the step S11. The user select buttons 151 related to the user IDs are included in the operational display page of the touch panel 150.

Step S13 causes the controller to determine whether an initialize command sent by another control program is detected by the controller. The controller includes a clock which measures an elapsed time from a start of the operation of the data processing device 100, and the initialize command is sent to the controller when the elapsed time measured by the clock exceeds a predetermined reference period. In addition, when the data processing of the entire data processing device 100 is terminated, the initialize command is sent to the controller.

When the result at the step S13 is affirmative (or when the initialize command is detected), step S32 causes the controller. to initialize all the user IDs and the operational matters of the RAM into predetermined initial values. After the step S32 is performed, step S33 causes the controller to initialize the operational display page of the touch panel 150 into a predetermined initial condition. After the step S33 is performed, step S34 causes the controller to initialize or clear the time measurement of the clock. After the. step S34 is performed, the control of the controller is transferred to the above step S13.

When the result at the step S13 is negative (or when the initialize command is not detected), step S14 causes the controller to determine whether any input of the touch panel 150 is given by the operator. When the result at the step S14 is affirmative, the next step S15 is performed. Otherwise the control of the controller is transferred to the above step S13.

Step S15 causes the controller to determine whether the clear button 153 of the touch panel 150 is depressed by the operator. When the clear button 153 is depressed, the control of the controller is transferred to the above steps S32, S33 and S34. Otherwise the next step S16 causes the controller to determine whether the transmit-cancel button 156 of the touch panel 150 is depressed by the operator.

When the transmit-cancel button 156 is depressed, the control of the controller is transferred to step S24, which will be described later. Otherwise the next step S17 causes the controller to determine whether the transmission of the user identification data to the file server 210 has been canceled.

Step S24 causes the controller to determine whether the transmission of the user identification data has already been canceled. When the result at the step S24 is affirmative, step S25 causes the controller to enable the transmission of the user identification data. Otherwise step S26 causes the controller to cancel the transmission of the user identification data. That is, each time the transmit-cancel button 156 is depressed, the transmission of the user identification data is either canceled or enabled, and this is repeated in an alternative manner. After the step S25 or the step S26 is performed, the control of the controller is transferred to above steps S33 and S34.

When the result at the step S17 is affirmative, the control of the controller is transferred to the above steps S33 and S34. On the other hand, when the result at the step S17 is negative, step S18 causes the controller to determine whether one of the user select buttons 151 of the touch panel 150 is depressed by the operator. When the result at the step S18 is negative, the control of the controller is transferred to the above step S34. Otherwise the next step S19 is performed.

Step S19 causes the controller to determine whether the one of the user select buttons 151 of the touch panel 150 corresponds to one of the read-out owner IDs that is different from the operator ID for the operator. When the result at the step S19 is negative, it is determined that the input user elect button 151 is depressed by the operator for the first time, and step S27 is performed, which will be described below. Otherwise the next step S20 is performed.

Step S27 causes the controller to acquire the operator ID for the input user select button 151 and store the user identification data in the storage device 101. After the step S27 is performed, step S28 causes the controller to set the individual user select buttons 151 of the touch panel 150 for the latest user selection in ON state by reading the user identification data from the storage device 101. After the step S28 is performed, the control of the controller is transferred to the above step S34.

Step S20 causes the controller to determine whether the input user select button 151 that is the same as the user select button 151 in the above step S18 is depressed again (or for the second time).

When the result at the step S20 is negative, it is determined that another user select button 151 that is different from the user select button 151 in the above step S18 is depressed at the step S20. Step S29 causes the controller to determine whether the owner ID for the other user select button 151 is included in the stored user identification data.

When the result at the step S29 is affirmative, it is determined that the owner ID has already been selected with respect to the stored user identification data. Step S30 causes the controller to omit the owner ID for the other user select button 151 from the user identification data stored in the storage device 101. In the step S30, the individual user select buttons 151 of the touch panel 150 are reset to the OFF state.

When the result at the step S29 is negative, it is determined that the owner ID has never been selected with respect to the stored user identification data. Step S31 causes the controller to include the owner ID for the other user select button 151, depressed at the above step S20, in the user identification data stored in the storage device 101. In the step S31, the individual user select buttons 151 of the touch panel 150 are set to the ON state by reading the modified user identification data from the storage device 101.

After the step S30 or the step S31 is performed, the control of the controller is transferred to the above step S34.

On the other hand, when the result at the step S20 is affirmative, step S21 causes the controller to determine whether the shift button 157 of the touch panel 150 is depressed by the operator. When the result at the step S21 is negative, step S22 causes the controller to set the individual user select buttons 151 of the touch panel 150, allocated for the set of the authorized user identifications of the second latest selection, in ON state by shifting the sequence of the reading of one of the plurality of sets of the authorized user identifications of the latest selections from the storage device 101 in the reverse chronological order. The step S22 is called the increment process.

When the result at the step S21 is affirmative, step S23 causes the controller to set the individual user select buttons 151 of the touch panel 150, allocated for the set of the authorized user identifications of the oldest selection, in ON state by shifting the sequence of the reading of one of the plurality of sets of the authorized user identifications of the latest selections to the chronological order. The step S23 is called the decrement process.

After the step S22 or the step S23 is performed, the control of the controller is transferred to above step S34.

In the data transmission apparatus and method of the above-described embodiment, the user identification data for the image data that need to be exchanged between the authorized users can be easily and conveniently handled by the users before the image data is captured and stored. After the completion of the user identification data allocation process of FIG. 5, the image data and the user identification data are stored together in the data processing device 100 in such a manner that the stored image data are subsequently accessed by only the authorized users indicated by the user identification data.

Figure 6:
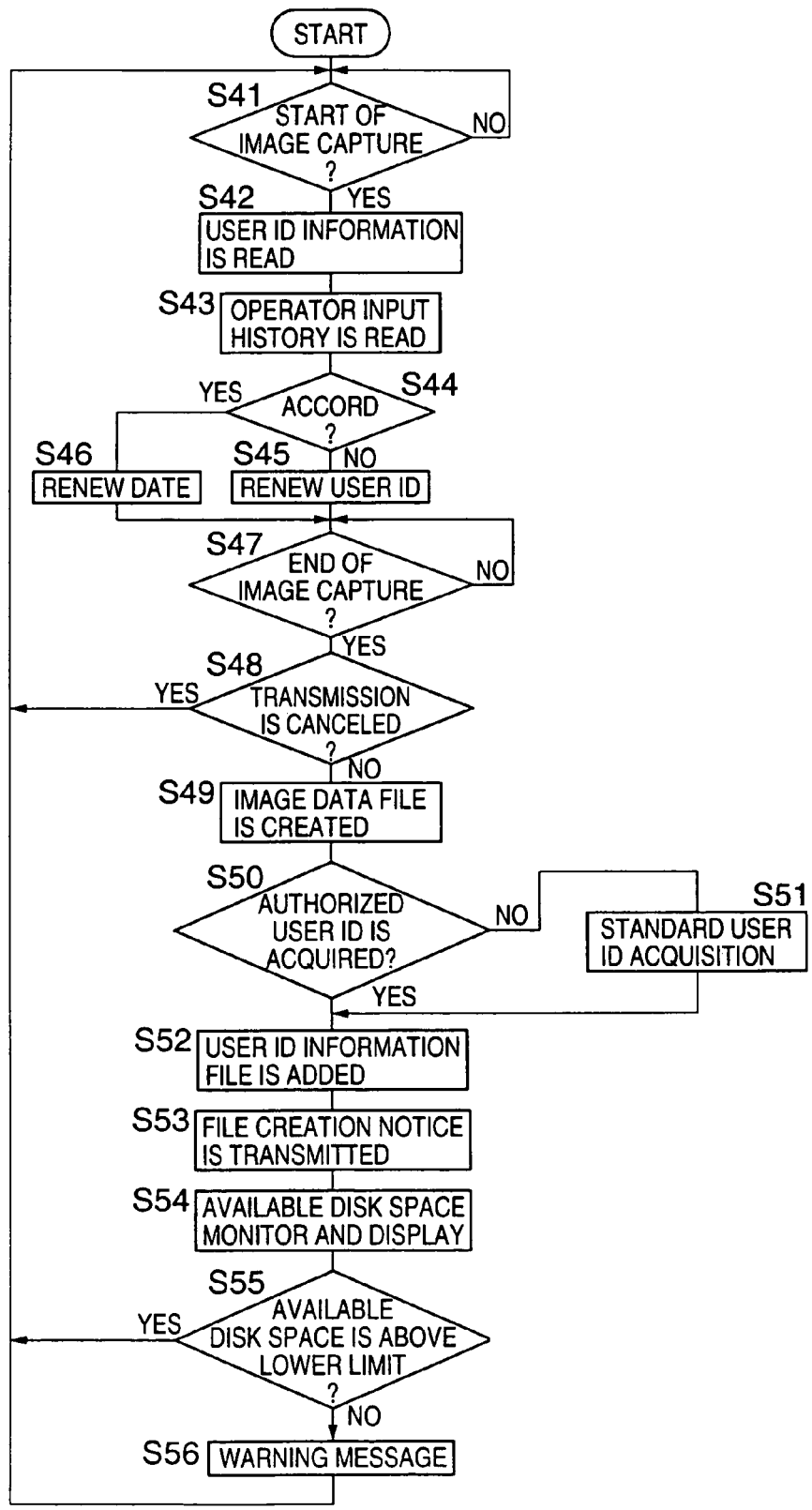
FIG. 6 is a flowchart for explaining a user identification data storage process executed by the data processing device of FIG. 1.

FIG. 6 shows a user identification data storage process executed by the controller 110 of the data processing device of FIG. 1. As described above, the data transmission apparatus and method of the present embodiment is applied to the data processing device 100 by installing a control program related to the flowchart of FIG. 6 in the ROM of the controller 110.

The user identification data storage process of FIG. 6 is performed after the completion of the user identification data allocation process of FIG. 5. In the following descriptions, the CPU of the controller 110 in FIG. 1 is referred to as the controller, for the sake of simplicity of description.

As shown in FIG. 6, at a start of the user identification data storage process, step S41 causes the controller to determine whether a start of the image capturing of the scanner 120 is detected. When the result at the step S41 is negative, the controller repeats performing the step S41. When the result at the step S41 is affirmative, step S42 causes the controller to read the authorized user identifications and other operational matters from the results of the user identification data allocation process of FIG. 5.

After the step S42 is performed, step S43 causes the controller to read the input history data for the operator from the storage device 101. Step S44 causes the controller to determine whether the set of the user identification data obtained at the step S42 accords with any item of the input history data obtained at the step 843.

When the result at the step S44 is negative, step S45 causes the controller to renew the oldest item of the input history data by the set of the user identification data obtained at the step S43, and to store the resulting input history data in the storage device 101. On the other hand, when the result at the step S44 is affirmative, step S46 causes the controller to renew the date of the matched item of the input history data by the date of the set of the user identification data obtained at the step S43, and to store the resulting input history data in the storage device 101.

After the step S45 or the step S46 is performed, step S47 causes the controller to determine whether an end of the image capturing of the scanner 120 is detected. When the result at the step S47 is negative, the controller repeats performing the step S47. When the result at the step S47 is affirmative, step S48 causes the controller to determine whether the transmission of the user identification data is canceled.

When the result at the step S48 is affirmative, the transmission is not performed, and the control of the controller is transferred to the above step S41. When the result at the step S48 is negative, step S49 causes the controller to create an image data file on the storage device 101 based on the captured image data.

After the step S49 is performed, step S50 causes the controller to determine whether the authorized user identifications for the captured image data are already selected. When the result at the step S50 is negative, step S51 causes the controller to select a standard user identification (the default setting data) as the operator ID for the captured image data. After the step S51 is performed, the control of the controller is transferred to the next step S52.

When the result at the step S50 is affirmative, step S52 causes the controller to add the user identification data file to the image data file, and to temporarily store the resulting image data file in the storage device 101. The user identification data file is created based on the user identifications (the operator ID and the owner IDs) of the user identification data.

After the step S52 is performed, step S53 causes the controller to transmit a file creation notice. Step S54 causes the controller to monitor the amount of the available storage of the storage device 101, and to display it in the available-disk space indication region 155 of the touch panel 150.

After the step S54 is performed, step S55 causes the controller to determine whether the amount of the available storage of the storage device 101 is above the lower limit. When the result at the step S55 is affirmative, the control of the controller is transferred to the above step S41. When the result at the step S55 is negative, step S56 causes the controller to display a warning message in the message indication region 154 of the touch panel 150, the warning message indicating the lack of the available storage of the storage device 101. After the step S56 is performed, the control of the controller is transferred to the above step S41.

In the data transmission apparatus and method of the above-described embodiment, the user identification data for the image data that need to be exchanged between the authorized users can be easily and conveniently handled by the users when the image data is captured and stored. After the completion of the user identification data storage process of FIG. 6, the image data and the user identification data are stored together in the data processing device 100 (and in the storage management device 210) in such a manner that the stored image data are subsequently accessed by only the authorized users indicated by the user identification data.

Accordingly, the data transmission apparatus and method of the present embodiment are effective in providing increased operability and availability of the stored image data for the users during the time the user identification data for the stored image data is entered into the data processing device 100, and in maintaining security of the image data stored in the data processing device 100.

Figure 7:
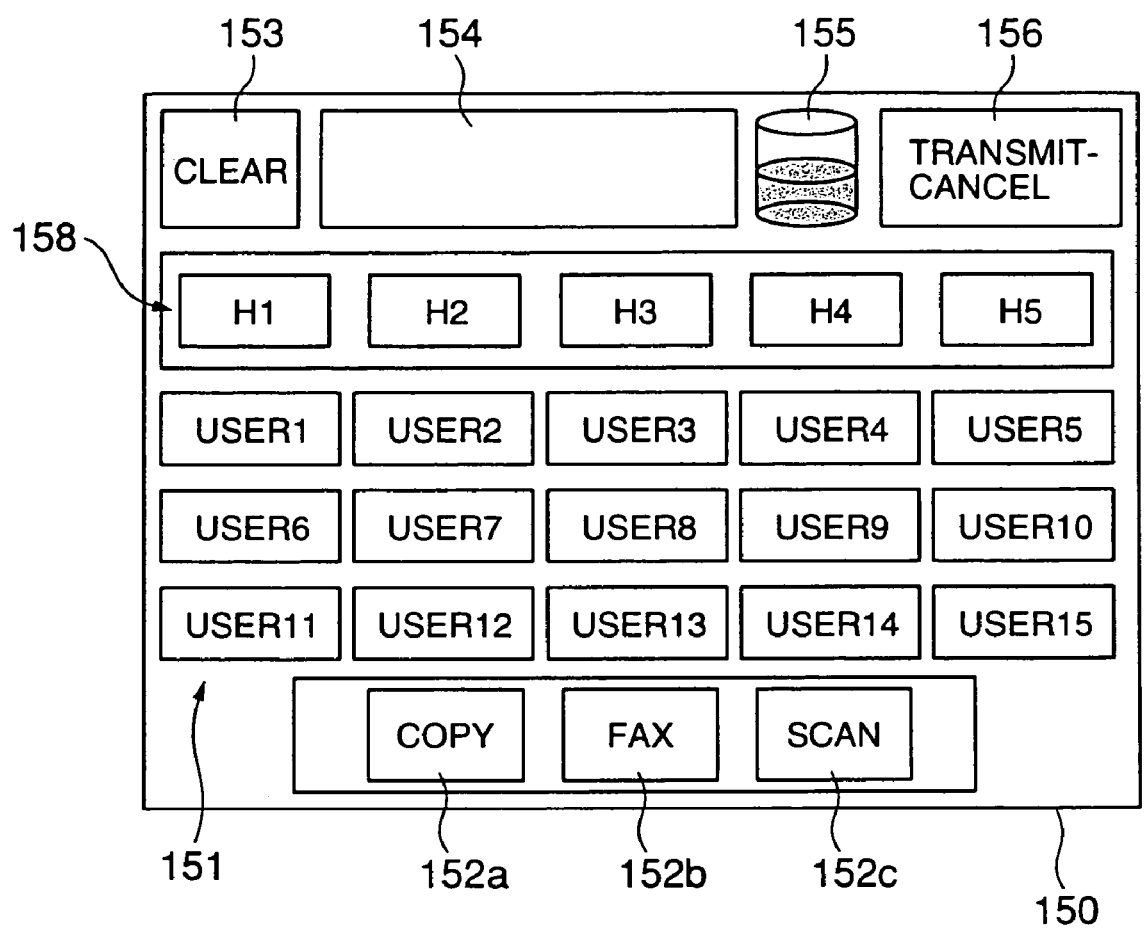
FIG. 7 is a diagram showing an operational display page of a touch panel in a data processing device to which another preferred embodiment of the data transmission apparatus of the invention is applied.

Next, FIG. 7 shows an operational display page of a touch panel in a data processing device to which another preferred embodiment of the data transmission apparatus of the invention is applied. In FIG. 7, the elements which are essentially the same as corresponding elements in FIG. 3 are designated by the same reference numerals, and a description thereof will be omitted.

Figure 8:
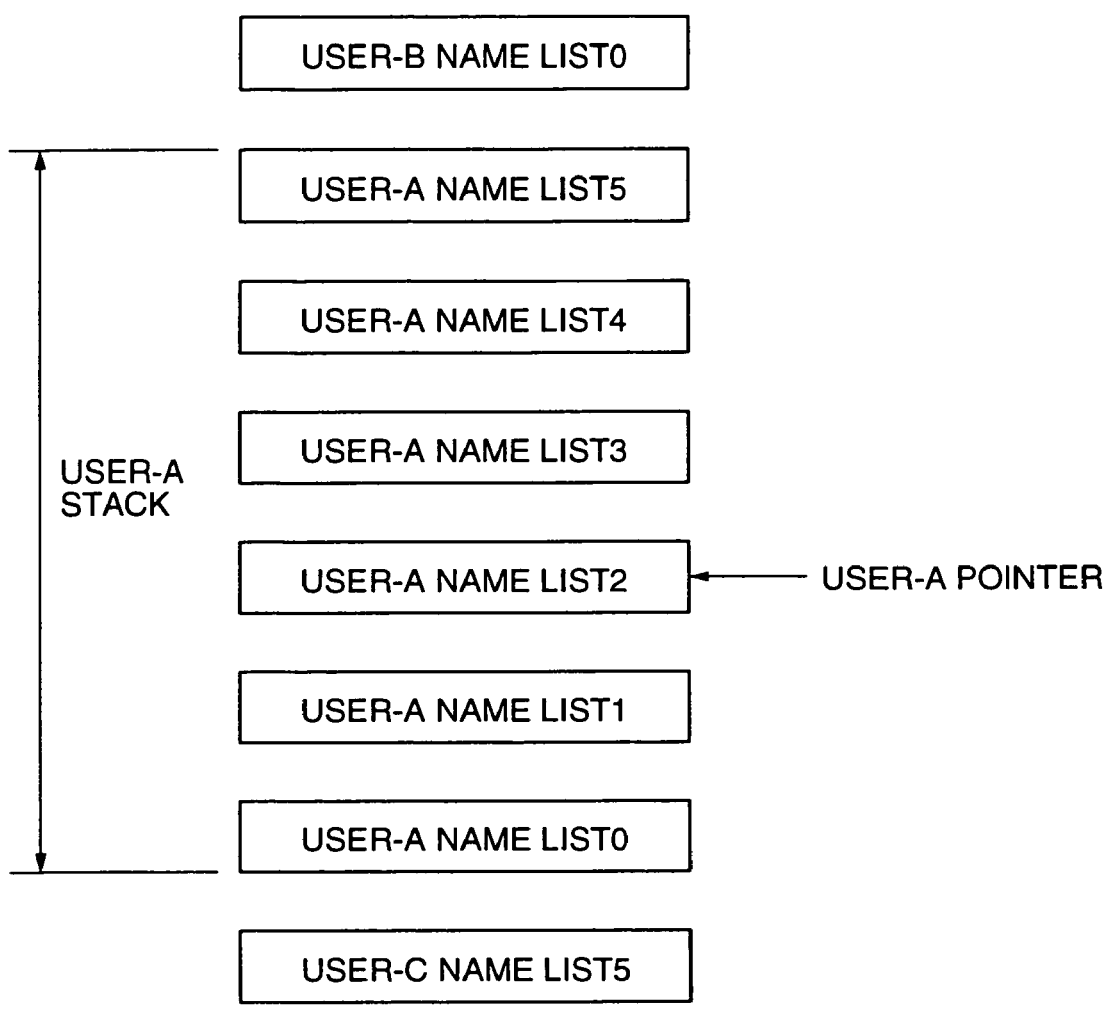
FIG. 8 is a diagram showing a structure of user identification data stored in the data processing device of FIG. 7.

As shown in FIG. 7, the touch panel 150 in the present embodiment includes a plurality of input history buttons ("H1", "H2", etc.) 158 in addition to the elements 151 through 156 of the previous embodiment of FIG. 3. The shift button 157 in the previous embodiment of FIG. 3 is omitted from the touch panel 150 in the present embodiment, FIG. 8 shows a structure of user identification data stored in the data processing device in the present embodiment.

In the data processing device of the present embodiment, the user identification data, allocated to the image data, are stored in the storage device 101, and they are transferred to the RAM of the controller 110. As shown in FIG. 8, the user identification data is constituted by various user stacks, such as a USER-A stack, a USER-B stack, a USER-C stack, etc. For example, the USER-A stack is provided with respect to a specific operator ID (USER-A), and contains a plurality of USER-A name lists including a USER-A name list0, a USER-A name list1, . . . , and a USER-A name list5.

The "H1" through "H5" input history buttons 158 of the touch panel 150 of FIG. 7 are assigned for reading the plurality of sets of the user identification data contained in the USER-A name list1 through the USER-A name list5, respectively. The USER-A name list0 is provided to temporarily store an intermediate selection of user identification data during the time of the entry of the user ID. The USER-A pointer is provided to indicate a starting location of the user identification data of the current selection.

In the data processing device of the present embodiment, the five sets of the authorized user identifications of the five latest selections that have been performed by the individual operator are stored, and the "H1" through "H5" input history buttons 158 of the touch panel 150 of FIG. 7 are assigned for reading the sets of the user identification data contained in the USER-A stack.

Figure 9:
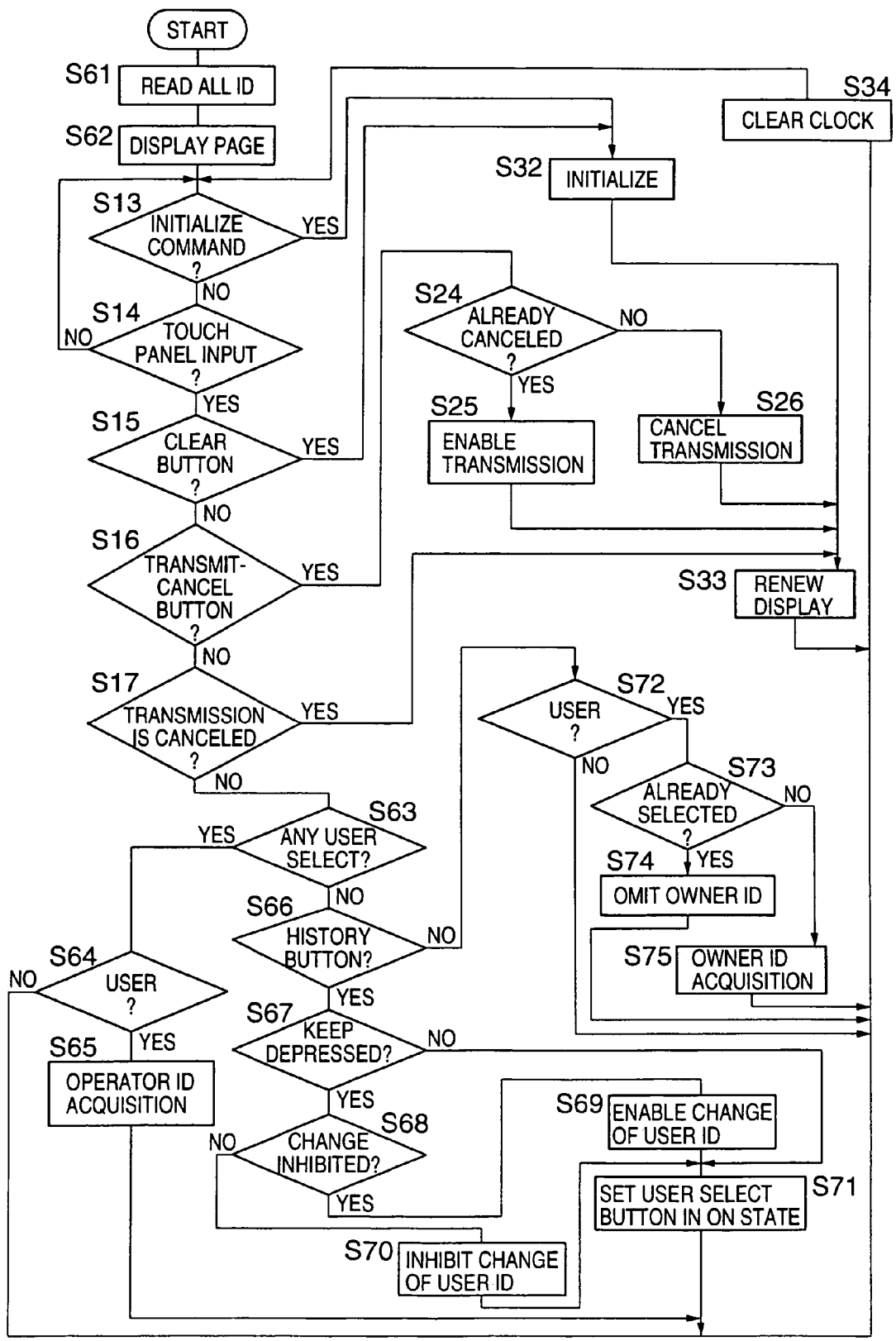
FIG. 9 is a flowchart for explaining a user identification data allocation process executed by the data processing device of FIG. 7.

FIG. 9 shows a user identification data allocation process executed by the data processing device in the embodiment of FIG. 7.

The data transmission apparatus and method of the present embodiment are applied to the data processing device 100 of FIG. 1 by installing a control program related to the flowchart of FIG. 9 (which will be described later) in the memory of the controller 110. The control program comprises program code instructions stored in the memory of the controller 110.

In FIG. 9, the steps which are essentially the same as corresponding steps in FIG. 5 are designated by the same reference numerals, and a description thereof will be omitted.

At a start of the user identification data allocation process of FIG. 9, step S61 causes the controller to read out all the user IDs of the user identification data file from the storage device 101 so that they are loaded into the RAM of the controller. In the present embodiment, the user identification data file is stored, in advance, in the storage device 101, and all the user IDs, inclusive of the operator IDs, the owner IDs, the input history data, and other operational matters which are predetermined with respect to the data processing device 100 are contained in the user identification data file.

After the step S61 is performed, step S62 causes the controller to display the operational display page of the touch panel 150 (FIG. 7) based on the read-out data of the user identification data file obtained in the step S61. The user select buttons 151 related to the user IDs and the input history data related to the latest selections are included in the operational display page of the touch panel 150 as shown in FIG. 7.

In the user identification data allocation process of FIG. 9, steps S13 through S17, steps S24 through S26 and steps S32 through S34 are essentially the same as corresponding steps in the previous embodiment of FIG. 5, and a description thereof will be omitted.

When the result at the step S17 is affirmative, the control of the controller is transferred to the above steps S33 and S34. On. the other hand, when the result at the step S17 is negative, step S63 causes the controller to determine whether no user ID is contained in the read-out data of the user identification data file. When the result at the step S63 is negative, the next step S66 is performed. Otherwise the next step S64 is performed.

Step S64 causes the controller to determine whether one of the user select buttons 151 of the touch panel 150 is depressed by the operator. When the result at the step S64 is affirmative, the next step S65 is performed. Otherwise the control of the controller is transferred to the above step S34. Step S65 causes the controller to acquire the operator ID for the input user select button 151 and store the user identification data in the storage device 101. After the step S65 is performed, the control of the controller is transferred to the above step S34.

Step S66 causes the controller to determine whether one of the input history buttons 158 of the touch panel 150 is depressed by the operator. When the result at the step S66 is negative, it is determined that none of the input history buttons 158 is depressed, and the next step S72 is performed (which will be described below). Otherwise the next step S67 is performed.

Step S67 causes the controller to determine whether the input history button 158 is kept depressed over a predetermined time period (for example, 5 seconds). When the result at the step S67 is negative, the next step S71 is performed (which will be described below). Otherwise the next step S68 is performed.

Step S68 causes the controller to determine whether the updating of the input history data for the input history key 158 which has been kept depressed over the predetermined time period, is set in a disable state. When the result at the step S68 is affirmative, it is determined that any change to the input history data is currently inhibited, and the next step S69 is performed. Otherwise the next step S70 is performed.

Step S69 causes the controller to cancel the disable state of the updating of the input history data and set the updating of the input history data in an enable state. After the step S69 is performed, step S71 causes the controller to acquire the user IDs from the user name list allocated for the selected input history button 158, store the modified user identification data in the storage device 101, and set the selected input history button 158 of the touch panel 150 in ON state. After the step S71 is performed, the control of the controller is transferred to the above step S34.

Step S70 causes the controller to set the updating of the input history data in the disable state so that any change to the input history data is inhibited. After the step S70 is performed, the control of the controller is transferred to the above step S71.

Step S72 causes the controller to determine whether one of the user select buttons 151 of the touch panel 150 is depressed by the operator. When the result at the step S72 is affirmative, the next step S73 is performed. Otherwise the control of the controller is transferred to the above step S34. Step S73 causes the controller to determine whether the owner ID for the selected user select button 151 is included in the user identification data.

When the result at the step S73 is affirmative, it is determined that the owner ID has already been selected with respect to the stored user identification data. Step S74 causes the controller to omit the owner ID for the selected user select button 151 from the stored user identification data. In the step S74, the individual user select buttons 151 of the touch panel 150 are reset to the OFF state.

When the result at the step S73 is negative, it is determined that the owner ID has never been selected with respect to the stored user identification data. Step S75 causes the controller to include the owner ID for the selected user select button 151 in the user identification data stored in the storage device 101. In the step S75, the individual user select buttons 151 of the touch panel 150 are set to the ON state by reading the modified user identification data from the storage device 101.

After the step S74 or the step S75 is performed, the control of the controller is transferred to the above step S34.

In the data transmission apparatus and method of the present embodiment, after completion of the user identification data allocation process of FIG. 9, a user identification data storage process that is similar to the flowchart of FIG. 6 is performed. Hence, the image data and the user identification data stored together in the data processing device 100 in such a manner that the stored image data are subsequently accessed by only the authorized users indicated by the user identification data.

According to the data transmission apparatus and method of the present embodiment, when a set of the user identification data is entered into the data processing device 100, the operator is required only to depress one of the plurality of the input history buttons 158 of the touch panel 150. The controller of the data processing device 100 inhibits the storage of a new set of the user identification data in the storage device when it accords with one of the sets of the stored user identification data, and it is possible for the present embodiment to avoid duplicate storage of the same set of the user identification data. Further, in the present embodiment, the assignment of one of the input history buttons 158 of the touch panel 150 for reading a set of frequently selected user IDs can be fixed.

In the data transmission apparatus and method of the above-described embodiment, the user identification data for the image data that need to be exchanged between the authorized users can be easily and conveniently handled by the users during the time the image data is captured and stored. After the completion of the user identification data allocation process of FIG. 9 as well as the user identification data storage process, the image data and the user identification data are stored together in the data processing device 100 in such a manner that the stored image data are subsequently accessed by only the authorized users indicated by the user identification data.

The present invention is not limited to the above-described embodiments, and variations and modifications may be made without departing from the scope of the present invention.

Further, the present invention is based on Japanese priority application No.11-122406, filed on Apr. 28, 1999, and Japanese priority application No.2000-088200, filed on Mar. 28, 2000, the entire contents of which are hereby incorporated by reference.

What is claimed is:

1. A data processing device which is connected to a data storage device, comprising:

an operations receiving unit having a display unit arranged to display a list of function select buttons indicating functions to-be executed by the data processing device and users, and arranged to receive input operations given by an operator;

a control unit connected to the operations receiving unit and arranged to control displaying of the display unit of the operations receiving unit, receive the input operations from the operations receiving unit, and control a data processing in accordance with the received input operations;

a scanner connected to the control unit and arranged to capture image data from a document by scanning the document;

a processing unit connected to the control unit and arranged to perform a data processing of the captured image data in accordance with instructions from the control unit; and a data transmission unit connected to the control unit and arranged to generate an image file, including the captured image data and additional information associated with the captured image data, and transmit the generated image file to the data storage device in accordance with instructions from the control unit, wherein the control unit is configured to cause the scanner to scan a document to capture image data from the document when the control unit receives, from the operations receiving unit, input operations given by the operator and including a selected user information, a selected function to be executed, and a processing start request, cause the processing unit to perform a data processing of the captured image data in accordance with the selected function to be executed included in the input operations, and cause the data transmission unit to generate an image file, including the captured image data and the selected user information of the input operations as the additional information associated with the captured image data, and transmit the generated image file to the data storage device.

2. The data processing device according to claim 1, wherein the selected user information includes information indicating one or more authorized users who are allowed to access the captured image data obtained by the scanner.

3. The data processing device according to claim 2, wherein the control unit includes an input history data storing unit configured to store in a storage device an input history data indicating a selected user information given by a specific operator when a processing is previously executed by the data processing device, the input history data stored in the storage device being associated with the specific operator, and wherein the control unit is configured to cause the display unit of the operations receiving unit to display, when the control unit receives input operations including a selected operator information from the input operations receiving unit, an input history data stored in the storage device and associated with an operator indicated by the selected operator information.

4. The data processing device according to claim 3, wherein the control unit is configured to determine, when the control unit receives input operations including a processing start request from the input operations receiving unit, whether a selected user information newly received from the input operations receiving unit accords with the input history data stored in the storage device, and wherein the control unit is configured to delete, when the selected user information does not accord with the input history data, an oldest input history data stored in the storage device, and cause the input history data storing unit to store the newly received user information in the storage device as a latest input history data.

5. The data processing device according to claim 4, wherein the control unit is configured to delete, when the selected user information accords with the input history data, the input history data stored in the storage device, and cause the input history data storing unit to store the newly received user information in the storage device as a latest input history data.

6. The data processing device according to claim 1, wherein the operations receiving unit is configured to receive the selected user information from the operator before the scanner scans the document, and the control unit is configured to link the selected user information to the image data captured by the scanning of the document.

7. A data processing method for a data processing device that is connected to a data storage device, comprising:

displaying a plurality of function select buttons on a display unit of the data processing device indicating functions to be executed by the data processing device and indicating information identifying users;

receiving input instructions from an operator on an operations receiving unit by selecting a user from the information identifying users, selecting a function from the functions to be executed, and requesting a start of a processing by said input instructions of said receiving;

controlling a data processing in accordance with the input instructions of said receiving;

scanning a document to capture image data by a scanner that is connected to the control unit, the scanning being performed after said selecting the user by the operator, selecting the function, and requesting the start of the processing;

performing data processing of the captured image data in accordance with the function from the functions to be executed of said input instructions of said receiving;

generating an image file including the captured image data and additional information associated with the captured image data; and transmitting the image file of said generating to the data storage device with a transmission unit in accordance with the input instructions of said receiving.

8. The method according to claim 7, wherein information associated to the selected user includes information indicating one or more authorized users who are allowed to access the captured image data obtained by the scanner.

9. The method according to claim 8, further comprising:

storing an input history data in a storage device, the input history data indicating a the information associated to the selected user when a processing is previously executed by said performing data processing, the input history data stored in the storage device being associated with the operator;

receiving input instructions on the operations receiving unit by selecting a function to display a history from the functions to be executed and selecting information indicating the operator; and displaying the input history data stored in the storage device that is associated with the operator by using the information indicating the operator after said receiving.

10. The method according to claim 9, further comprising:

determining whether a selected user information newly received from said step of receiving accords with the input history data stored in the storage device;

deleting an oldest input history data stored in the storage device in case the selected user information does not accord with the input history data; and storing the newly received user information in the input history data storing unit as a latest input history data.

11. The method according to claim 10, further comprising:

deleting the input history data stored in the storage device when the selected user information accords with the input history data; and storing the newly received user information in the storage device as a latest input history data.

12. The method according to claim 7, wherein said receiving input instructions is receiving the selected user information from the operator before the scanner scans the document, and wherein said performing data processing is linking the selected user information to the image data captured by said scanning the document.

* * * * *